Figure 1:
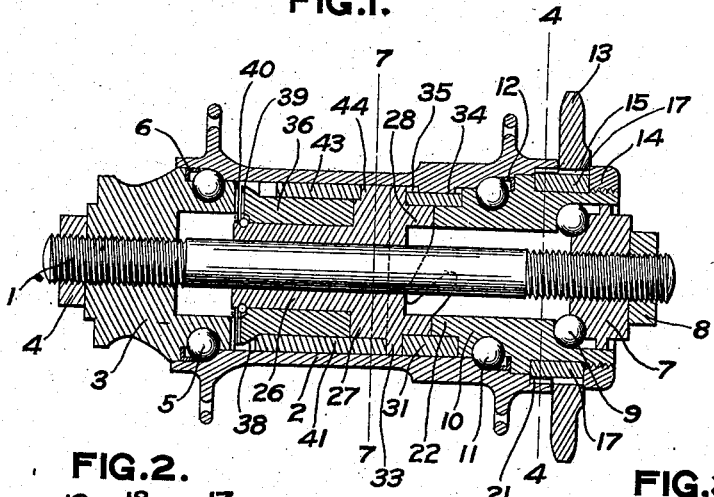

A. P. MORROW.
DRIVING CLUTCH.
APPLICATION FILED OCT. 2, 1907.

No. 905,343.

Patented Dec. 1, 1908.

2 SHEETS—SHEET 1.

WITNESSES:
N. Gurnee
C. W. Carroll

INVENTOR:
Alexander P. Morrow
by Osgood & Davis
his attorneys

A. P. MORROW.
DRIVING CLUTCH.
APPLICATION FILED OCT. 2, 1907.
905,343.
Patented Dec. 1, 1908.
2 SHEETS—SHEET 2.
FIG.6. FIG.7.
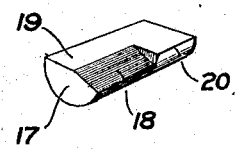
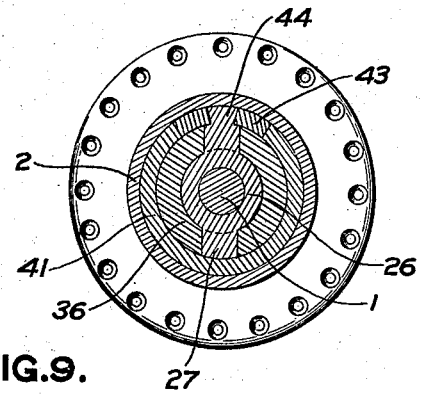
FIG.8. FIG.9. FIG.10.
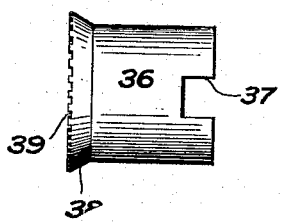
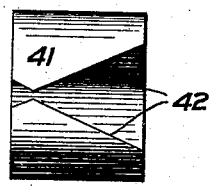
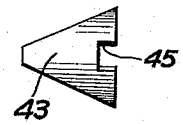
FIG.11. FIG.12. FIG.13. FIG.14.
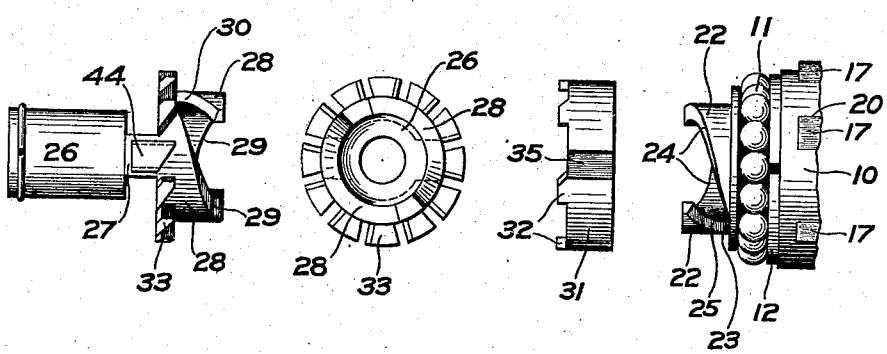
WITNESSES:
D. Gurnee
C. W. Carroll
INVENTOR:
Alexander P. Morrow
by Osgood & Davis
his attorneys

UNITED STATES PATENT OFFICE.

ALEXANDER P. MORROW, OF ELMIRA, NEW YORK.

DRIVING-CLUTCH.

No. 905,343.　　　　Specification of Letters Patent.　　　Patented Dec. 1, 1908.

Application filed October 2, 1907. Serial No. 395,630.

*To all whom it may concern:*

Be it known that I, ALEXANDER P. MORROW, a citizen of the United States, and resident of Elmira, in the county of Chemung and State of New York, have invented certain new and useful Improvements in Driving-Clutches, of which the following is a specification.

This invention relates to a driving clutch for free wheels.

It has for its object the production of a device with few parts, which combine simplicity and strength, and is positive in action.

In the drawings the clutch is shown in connection with a bicycle hub, and a back pedaling brake therefor.

Figure 2:
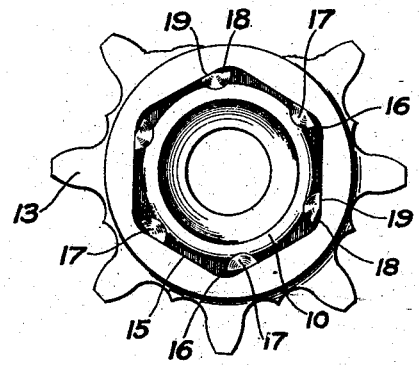
Figure 3:
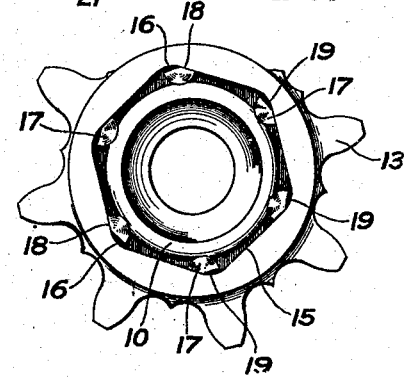
Figure 4:
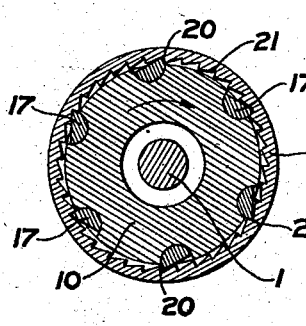
Figure 5:
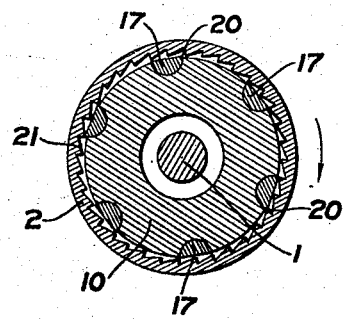

Figure 1 is a longitudinal central section of the bicycle hub; Fig. 2 is an elevation of the hub and its driving sprocket, in relative position for driving; Fig. 3 is the same, in coasting position; Fig. 4 is a section on the line 4—4 of Fig. 1, looking toward the left of said figure, the parts being in driving position; Fig. 5 is the same as Fig. 4, the parts being in coasting position; Fig. 6 is a perspective view of one of the clutch pawls; Fig. 7 is a section on the line 7—7 of Fig. 1; Fig. 8 is an elevation of the brake block; Fig. 9 is an elevation of the brake sleeve; Fig. 10 is an elevation of the brake wedge; Fig. 11 is a side elevation of the brake actuator; Fig. 12 is an end elevation of the same; Fig. 13 is a side elevation of the clutch ring; and Fig. 14 is a side elevation of the driver.

Referring to the drawings, 1 is the shaft, and 2 the hub. The brake anchor, consisting of a block 3, is locked in place by a nut 4, and is held from revolving by engagement with the rear fork of a bicycle in the ordinary manner. Ball bearings 5, upon which one end of the hub 2 revolves, are supported in a raceway in the block 3 by means of a retaining-ring 6. A cone 7 on the opposite end of the shaft 1 is locked in place by a nut 8, and supports balls 9, which form a bearing for one end of the sleeve 10. The right hand end of the hub 2 revolves upon balls 11, which are retained in a raceway on the driver 10 by a ring 12.

The sprocket 13 surrounds the sleeve 10, and is held against the end of the hub 2 by a collar 14. Through the center of the sprocket is a hexagonal aperture 15 (Figs. 2 and 3), the corners 16 of which are somewhat curved or rounded.

In suitable sockets on the outer periphery of the sleeve 10, are six semi-cylindrical bars 17, which extend from the outer face of the sprocket 13 to a distance within the hub 2. Each of said bars is semi-cylindrical for only part of its length, the remaining portion being cut away at a slight angle to the flat side (Fig. 6), thus forming on that part of the bar two faces 18 and 19. The shoulder 20 of the semi-cylindrical portion therefore projects above the plane of the face 18.

The hexagonal aperture 15 in the sprocket 13 is of such dimensions that it fits closely around the bars 17, when the latter are in their places upon the sleeve, and the faces of said aperture lie in contact either with the faces 19 on all the bars 17, or the faces 18 thereof. If in the former position (Fig. 2), the bars 17 are tilted so that the shoulder 20 of each projects beyond the periphery of the sleeve, and engages the teeth of a ratchet 21 (Fig. 4), which is cut in the end of the hub 2. If the sprocket is then rotated forwardly, (as indicated by the arrow), the faces of the aperture 15 wedge the bars 17 tightly against their sockets in the driver and the latter is thereby carried around with said sprocket.

On back-pedaling, the sprocket is immediately released from the faces 19 of the bars 17, and as it rotates backward, the curved corners of the aperture 15 bear against the outer edges of the faces 18, and tilt the bars 17 into the position shown in Fig. 3. In this position the faces of the aperture 15 next adjacent to the faces which formerly bore against the faces 19 of the bars 17, bear against the faces 18 of said bars. The shoulder 20 is thereby moved inwardly, and thus away from engagement with the ratchet 21, (Fig. 5). Upon further backward rotation of the sprocket, the sleeve 10 is turned backward also.

On the inner end of the sleeve are two semi-circular wedges 22 (Fig. 14), and in the highest portion of each wedge is cut a notch 23. The formation of these notches makes each wedge 22 a sort of hook, having the long gradual incline 24 on its outside, and a short steep incline or wedge-face 25 on its inner side.

The brake actuator (Fig. 11) comprises sleeve 26, revoluble upon the shaft 1, and which is joined by a squared lug 27 to a pair of semicircular wedges 28, exactly like the wedges 22. These wedges have gradually inclined faces 29 adapted to engage the faces 24, and also sharply-inclined faces 30, adapted to engage the faces 25.

Normally, the wedges 22 and 28 lie in contact with each other (Fig. 1), and in this position backward rotation of the driver causes the wedge-faces 24 to act against the wedge-faces 29, and move the brake actuator to the left. Then upon forward pedaling, the faces 25 engage the faces 30 on the brake actuator, and the resulting cam action moves said actuator toward the sprocket end of the shaft 1.

A ring 31 (Fig. 13) surrounds the wedges 24 and 28, and has upon its left end a series of teeth 32. Said teeth are, upon forward rotation of the brake actuator, engaged by similar teeth 33 upon the periphery of the wedges 28, and the ring 31 is thus rotated with said actuator. A lug 34 on the inside of the hub 2, (Fig. 1) at all times lies within a slot 35 in the periphery of the ring 31, and therefore said hub revolves with said ring.

The brake block (Fig. 8) consists of a cylinder 36, which fits upon the sleeve 26 of the brake-actuator. In the right hand end of the said block is a square notch 37, within which lies the square lug 27. At the left end of the cylinder 36 is a tapered portion 38, having upon its end serrations 39 which are adapted to engage similar serrations 40 on the brake-anchor 3, and thus to hold the cylinder stationary.

Surrounding the brake block 36 is the brake sleeve or shoe 41, which is a hollow cylinder, split to form acutely-beveled faces 42. A wedge 43 lies within the angle formed by the two faces 42, and in contact with said faces. The wedge 43 is held in place by a lug 44 on the brake actuator, which enters a square notch 45 in said wedge.

What I claim is:—

1. The combination of a driving member, having an angular aperture; a driven member concentric therewith; and a bar rotatively supported within the aperture in the driving member, said bar having oppositely inclined surfaces adapted to be engaged, respectively by the inclined faces of the angular aperture in the driving member.

2. The combination of a driving member having an angular aperture; a driven member adjacent thereto; and a bar rotatively supported within the aperture in the driving member and extending within the driven member, said bar having oppositely inclined surfaces, adapted to be engaged, respectively, by the inclined faces of the angular aperture in the driving member, and also having a shoulder adapted to engage the driven member when in one position only.

3. The combination of a driven member; a driving member, having an angular aperture; a revolubly supported sleeve within the aperture in the driving member, having a socket; a rotative bar in the socket in said sleeve, having oppositely inclined surfaces, adapted to be engaged, respectively, by the inclined faces of the angular aperture in the driving member, and also having a shoulder adapted to engage the driven member when in one position only.

4. The combination of a driven member; a driving member, having a multi-angular aperture; and a plurality of bars rotatively supported within said aperture at the angles, respectively, and extending within the driven member, said bars having, respectively, oppositely inclined surfaces, adapted to be engaged, respectively, by the inclined faces of the driving member, and also having, respectively, shoulders adapted to engage the driven member when in one position only.

5. The combination of a driven member; a brake mechanism; a driving member, having an angular aperture; a revolubly supported sleeve within the aperture in the driving member, having a socket, and adapted to operate said mechanism when turned in one direction; a rotative bar in the socket in said sleeve, having oppositely inclined surfaces, adapted to be engaged, respectively, by the inclined faces of the angular aperture in the driving member, and also having a shoulder adapted to engage the driven member when in one position only.

ALEXANDER P. MORROW.

Witnesses:
EDWARD S. GIBBS,
EUNICE B. WEST.